United States Patent [19]
Lehmann et al.

[11] Patent Number: 6,069,975
[45] Date of Patent: May 30, 2000

[54] METHOD AND DEVICE FOR PROCESSING A SIGNAL

[75] Inventors: Klaus Lehmann, Höchstadt/Aisch; Peter Kartmann, Uttenreuth; Christian Heilmann, Thundorf, all of Germany

[73] Assignee: Siemsn Aktiengesellschaft, Munich, Germany

[21] Appl. No.: 09/192,755

[22] Filed: Nov. 16, 1998

Related U.S. Application Data

[63] Continuation of application No. PCT/DE97/00982, May 15, 1997.

[30] Foreign Application Priority Data

May 15, 1996 [DE] Germany ............... 196 19 572

[51] Int. Cl.$^7$ .................................................. G06K 9/46
[52] U.S. Cl. ........................ 382/207; 702/69; 375/334
[58] Field of Search .............................. 382/100, 207, 382/128, 276, 280, 281; 702/66, 69–71, 75–79; 708/400, 443, 820, 822; 324/76.47; 375/272, 278, 303, 324, 334, 338, 346

[56] References Cited

U.S. PATENT DOCUMENTS

| | | | |
|---|---|---|---|
| 4,983,906 | 1/1991 | Hiller | 702/75 |
| 4,984,188 | 1/1991 | Kato | 708/400 |
| 5,109,862 | 5/1992 | Kelen et al. | 364/413.06 |

FOREIGN PATENT DOCUMENTS

| | | |
|---|---|---|
| 0350120A1 | 1/1990 | European Pat. Off. . |
| 3706865A1 | 9/1988 | Germany . |

OTHER PUBLICATIONS

"Wigner–Verteilung als Werkzeug zur Zeit–Frequenz–Analyse nichtstationärer Signale", Olaf Skerl et al., tm–Technisches Messen 61, 1994, pp. 7–15.

*Primary Examiner*—Bhavesh Mehta
*Attorney, Agent, or Firm*—Herbert L. Lerner; Laurence A. Greenberg; Werner H. Stemer

[57] ABSTRACT

A signal is processed for recognize an irregularity in the signal. First, an orthogonal imaginary signal corresponding to the signal to be processed is formed. This is followed by a transformation step, which is then followed by a differentiation step. The signal thus processed shows the irregularity particularly clearly, so that the irregularity can be isolated, selected and detected. Preferred fields of application for the present method and corresponding devices are in the medical field, information technology, and signal treatment in network engineering, in particular low, medium, and high voltage engineering.

26 Claims, 7 Drawing Sheets

METHOD AND DEVICE FOR PROCESSING A SIGNAL

CROSS-REFERENCE TO RELATED APPLICATION

This is a continuation of copending International Application PCT/DE97/00982, filed May 15, 1997, which designated the United States.

BACKGROUND OF THE INVENTION

Field of the Invention

The invention relates to a method and to a device for processing a signal, in particular for recognizing an irregularity in the signal.

An irregularity in a signal, in particular an analog measurement signal, can in practice often be recognized or ascertained only with difficulty. This is particularly so if the irregularity is very small in comparison with the signal. As a rule, the signal must to this end be converted in a suitable way. The term irregularity is defined, in this context, as an interference in the signal, a superimposed interference signal, or an irregularity due to an effect on or distortion of the signal. The signal itself may in this case be present as analog or digital information.

One known approach for converting the signal to form a complex time signal is represented by the Hilbert transform. The Hilbert transform is used, for example, for modeling in data technology to form a so-called analytical signal.

Reference is had, in this regard to an article by Skerl et al., "Wigner-Verteilung als Werkzeug zur Zeit-Frequenz-Analyse nichtstationärer Signale" [Wigner Distribution As A Tool For The Time-Frequency Analysis Of Non-Steady Signals], in tm—Technisches Messen 61 (1994) 1, pages 7–15. The method mentioned therein provides an interrelation between signals shifted relative to one another in autocorrelation fashion and their transformation.

A system for calculating the real and imaginary parts of an input signal is described in U.S. Pat. No. 4,984,188 to Kato. The two signal parts are then either treated to form a mean or, after forming a ratio, processed using the arctangent function. The object of that signal treatment is to obtain an interference-free signal.

A system for estimating the frequency of a signal is known from U.S. Pat. No. 4,983,906 to Hiller. The frequency analysis achieves phase-invariant evaluation of a signal by forming a normal and quadrature component, for example by applying the Hilbert transform. This is intended to permit improved frequency analysis.

German published patent application DE-37 06 865 A1 discloses a method in which complex-value time signals are produced by modulation with mutually orthogonal carriers. This is followed by forming an arctangent. The method is intended to achieve efficient determination of a bearing angle.

SUMMARY OF THE INVENTION

It is accordingly an object of the invention to provide a method and device for processing a signal, which overcomes the disadvantages of the heretofore-known devices and methods of this general type and which allows for a small irregularity in the signal to be more easily recognizable using simple means.

With the foregoing and other objects in view there is provided, in accordance with the invention, a method for detecting an irregularity in a signal, which comprises the following steps:

forming an orthogonal imaginary signal corresponding to a signal to be processed;

producing a time-dependent further signal based on the signal and the imaginary signal;

differentiating the further signal to form a differentiated signal; and subjecting the differentiated signal to detection with regard to an irregularity in the signal.

The novel method may also be summarized as follows: an orthogonal imaginary signal corresponding to the input signal is formed, a common mean signal $\bar{z}(t)$ is formed from the input signal and the imaginary signal as a weighted function of time, and the mean signal $\bar{z}(t)$ is differentiated. Or, the orthogonal imaginary signal corresponding to the signal is formed, a ratio between the imaginary signal and the input signal is formed, the ratio signal is mapped to a finite set of values using a mapping function, and the mapped ratio signal is differentiated.

With the utilization of only simple means, the two methods make it easier to recognize an irregularity in the signal by bringing it out superproportionately and thereby making it more readily detectable. The method can be carried out very quickly using a computer and using little in the way of computing resources.

In accordance with an added feature of the invention, the producing step comprises forming a common mean signal as a weighted function of time from the signal and the imaginary signal.

In accordance with another feature of the invention, the producing step comprises forming the further signal as a ratio signal from the imaginary signal and the signal, and which further comprises matching the ratio signal to a finite set of values using a mapping function.

In accordance with an additional feature of the invention, the common mean signal is formed from $$\bar{z}(t) = \sqrt{k1 \cdot \hat{s}^2(t) + k2 \cdot s^2(t)},$$

wherein k1 and k2 are weighting factors, s(t) is the signal, and ŝ(t) is the imaginary signal. The factors k1 and k2 can, depending on the application be set in accordance with particular application. They may be equal or unequal. This kind of signal processing is very straightforward and can, where appropriate, even be carried out using simple analog components. In the case of a digital embodiment, only moderate computing resources are needed.

In accordance with again an added feature of the invention, the further signal is differentiated two or more times. In other words, the above-outline process may be followed by a second and/or a third differentiation step. In this way, according to the application, an irregularity may be brought out even better from the signal waveform.

Advantageously, the singly or multiply differentiated signal may be respectively subjected to pattern recognition so as to provide accurate detection of the irregularity, especially interference. After or upon recognition of an irregularity, a message signal (display, alarm, etc.) may optionally be produced which is then forwarded for further processing or information display.

In accordance with yet an added feature of the invention, the input signal is a signal used in a medical apparatus, i.e, the novel process is particularly suitable for use in the medical technology field. Such applications are primarily suited for processing on-line phonocardiogram signals, late potential signals, or EEG signals.

Advantageously, the method may also be used in information technology, especially for use in the demodulation of a frequency-shift keying signal (FSK signal). Irregularities can thereby be quickly and reliably recognized and dealt with. The term "dealing with" may generally be taken in the method to mean stopping out, selecting or filtering out. It is thereby possible for the irregularity or the interference signal, where appropriate, to be selectively fed for further processing, so that it is used as an information signal.

The method also finds an advantageous use in measured-signal processing in an electrical power supply, in particular in low, medium or high voltage engineering. It is thereby possible for a current or voltage signal of a power supply network to be used as the signal. In this case, the short processing times and the reliable working mode are particularly advantageous. Special applications relating to this case include metering technology (flow and electricity readings) and network protection technology.

With the above and other objects in view there is also provided, in accordance with the invention, an apparatus for detecting an irregularity in a signal, comprising:
a first device for forming an orthogonal imaginary signal from a signal to be processed;
a second device connected to the first device for producing a time-dependent further signal based on the signal and the imaginary signal;
a differentiating member connected to receive the further signal from the second device for forming a differentiated signal; and
a detector connected to the differentiating member for detecting from the differentiated signal an irregularity in the signal.

In accordance with an added feature of the invention, the second device comprises an averager for producing from the signal and the imaginary signal a common mean signal as a function of time.

In accordance with an additional feature of the invention, the second device comprises a divider component for producing a ratio signal from the imaginary signal and the signal, and a mapping component for mapping the ratio signal onto a finite set of values using a mapping function.

In accordance with another feature of the invention, there is provided a second differentiating component connected to the first above-mentioned differentiating component for differentiating the differentiated signal output by the first differentiating component. If a third differentiation is desired, a third differentiating component may be connected to the second differentiating component. This makes the recognition of an irregularity particularly reliable.

In an alternative embodiment, the differentiating component has a second or further differentiating function.

The above-mentioned advantages with reference to the methods apply to these devices as appropriate. The first differentiating component may have a second differentiating component connected downstream of it, and where appropriate the second differentiating component may have a third differentiating component connected downstream of it.

In accordance with a further feature of the invention, there is provided a pattern-recognition module connected to the differentiating component. Where appropriate, the pattern recognition module also outputs a message signal on recognition of an irregularity. The pattern recognition may, for example, be carried out with the aid of a filter.

In accordance with a concomitant feature of the invention, there is provided a computer, and the first device, the second device, the differentiating member, and the detector are respective program modules being processed in the computer. In other words, the novel device is integrated as a computer, i.e. a digital processing instrument, and the instruments and components used for the signal treatment are designed as program modules. The advantages of the invention can thereby be utilized particularly well.

One essential basic concept of the invention consists in that, from time signals which, from a mathematical viewpoint, have apparently unnecessarily complex shapes, ratios in the time domain are also formed and, by number transformation from the number space $$-\infty \leq \frac{\hat{s}}{s} \leq \infty,$$

for example by the arctan operation, are converted into a finite, expediently processable defined number space, for example $-\Pi \leq \phi \leq \Pi$.

In contrast to conventional signal and system theory, in which the known functions amplitude, phase and group propagation time are basically functions of angular frequency or frequency, the present terms or signals which have been treated are functions of time.

The basis of the method is to form an imaginary part $\hat{s}(k^*T_A)$ corresponding to a sampled signal waveform or signal $s(k^*T_A)$ of interest. To this end, the imaginary signal $\hat{s}(k^*T_A)$ is orthogonally determined or calculated. This gives a time-dependent complex signal $z(k^*T_A)=s(k^*T_A)+j\hat{s}(k^*T_A)$. In other words, this means that the recalculated orthogonal imaginary signal is interpreted as an imaginary part.

The following may be used to calculate this new signal part or the imaginary signal:
the Hilbert transform of $s(k^*T_A)$ (known from information technology),
differentiation of $s(k^*T_A)$,
integration of $s(k^*T_A)$,
a sliding average of $s(k^*T_A)$, that is to say $$\sum_{v=0}^{M-1} s[(k-v)*T_A]$$

as an approximately offset-proof integration.

In the above, k is a propagation time index and $T_A$ is the time between two sampling points.

Interpretation of the complex time signal $z(k^*T_A)$ in the form of amplitude $$\bar{z}(k*T_A) = \sqrt{s^2(k*T_A) + \hat{s}^2(k*T_A)}$$

(geometric mean) and phase $\phi(k^*T_A)$=arctan $$\frac{\hat{s}(k*T_A)}{s(k*T_A)}$$

also makes it possible to calculate the angular velocity $\dot{\phi}(k^*T_A)$ by a single differentiation of $\phi(k^*T_A)$, and the angular acceleration $\ddot{\phi}(k^*T_A)$ by double differentiation of $\phi(k^*T_A)$.

The signal $\bar{z}(k^*T_A)$ formed may be subjected to further processing steps, in order to form the so-called radial velocity $\dot{\bar{z}}(k^*T_A)$ by single differentiation of $\bar{z}(k^*T_A)$ and the radial acceleration $\ddot{\bar{z}}(k^*T_A)$ by double differentiation of $\bar{z}(k^*T_A)$.

All described and derived variables are functions of time.

Depending on the complexity of the task or the application of the signal processing in question, that is to say determining small irregularities in a segment of a signal $s(k*T_A)$, the described variables may be sufficient to fulfill the present analysis task. In addition, for example, related variables such as $$\sqrt{\dot{z}^2(k*T_A)+\dot{\varphi}^2(k*T_A)}, \frac{ds(k*T_A)}{d(k*T_A)}*H\{s(k*T_A)\}$$

may also be formed.

Examples of possibilities for interpreting and evaluating irregularities in a technical signal waveform include:
recognizing the pick-up of an armature in the case of DC or AC voltage relays from the current waveform,
ascertaining the cycles executed by a stepper motor from the current waveform,
irregularities in systems for measuring position and displacement from the sensor signal,
determining the instantaneous frequency in the case of FSK modulated signals for high speed data transmission, and
determining irregularities in the case of rotary processes.

Further possible uses are found in medicine, for example in the case of irregularities in cardiac valve activity, represented in so-called phonocardiograms, and in the signal representation and the analysis of "late potentials." These are multidimensional ECG signals which indicate sequelae in patients after a myocardial infarction.

Other features which are considered as characteristic for the invention are set forth in the appended claims.

Although the invention is illustrated and described herein as embodied in a method and device for processing a signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
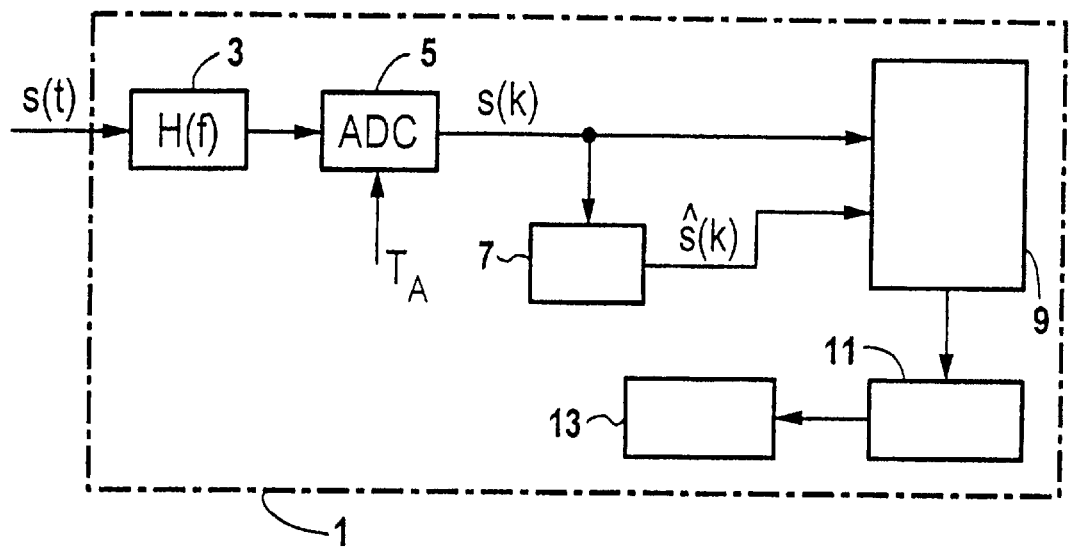
FIG. 1 is a block diagram of the novel device.

Referring now to the figures of the drawing in detail and first, particularly, to FIG. 1 thereof, there is seen a device 1 for processing a signal s(t). The signal s(t) with one or more irregularities, or a periodic sequence $s_p(t)$ of signal segments—after suitable analog prefiltering in a filter 3—is converted into a discrete numerical sequence by means of an analog/digital converter 5 to which sampling information $T_A$ is fed.

A component or an imaginary signal $\hat{s}(k*T_A)$, which corresponds to the real sampled signal $s(k*T_A)$ and can be regarded as an "imaginary part" of $s(k*T_A)$, is produced by an orthogonal signal transformation in the discrete domain.

This may be done, for example, in a separate transformation component 7 or in a computer 9. The transformation component 7 may in this case also be formed by the computer 9, for example as a program module. The device 1 further has a memory 13 for storing programs, data and signals, and a man/machine interface, for example a display screen 11.

Through further suitable signal transformations, such as calculating the amplitude, differentiation, integration, calculating the inverse tangent, and combinations of such operations, applied to the complex signal $z(k*T_A)=s(k*T_A)+j\hat{s}(k*T_A)$ which is formed, small irregularities in the waveform of the signal $s(k*T_A)$ can advantageously be extracted and determined, in particular in terms of when, whether and how often such features occur.

Depending on the real-time requirement of the treatment, the requisite signal transformations and relations can be embodied by special hardware and software of general-purpose computers.

Figure 2:
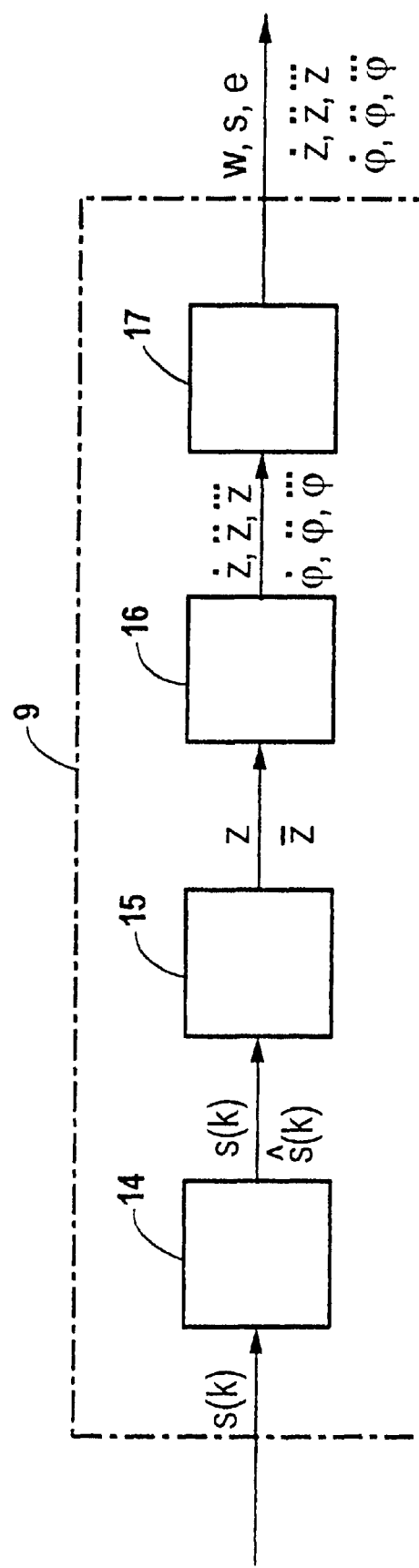
FIG. 2 is a block diagram of a detail of the device according to FIG. 1.

FIG. 2 shows a block diagram of the functions of a treatment instrument, in particular the computer 9, in detail. It has an instrument 14 for forming an orthogonal imaginary signal from the signal s(t). This instrument has a processing module 15 connected downstream of it. The latter may be designed as an averager in the above-described sense, or as a divider component with a mapping component connected downstream. The operations or transformations referred to in the introduction may be used as the mapping functions.

After this, a differentiation module 16 is provided which may comprise one or more differentiation components or differentiation functions. The differentiated output signals from the differentiation module 16 may then be fed to a pattern recognition module 17. The latter may, for example, be equipped with a filter function for selecting or recognizing the irregularity. The output signal then provided may, for example, be a warning signal w, a selected signal se or the input signal from which the irregularity has been removed.

Further details of the novel methods and the corresponding devices will be explained below with reference to special illustrative embodiments.

EXAMPLE 1

Figure 3:
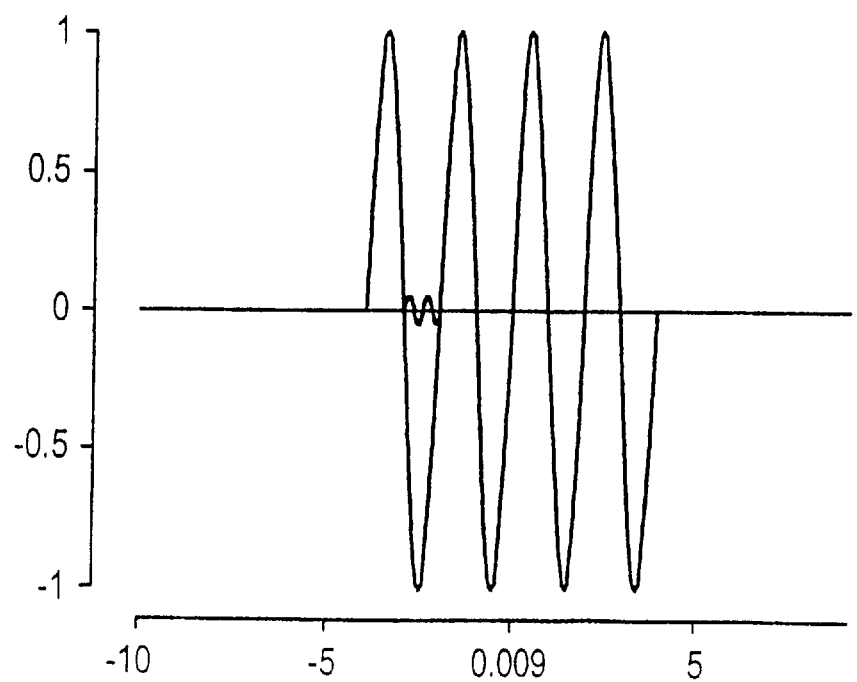
FIGS. 3 to 12 are signal waveform graphs pertaining to various application examples of the method and the device.
Figure 4:
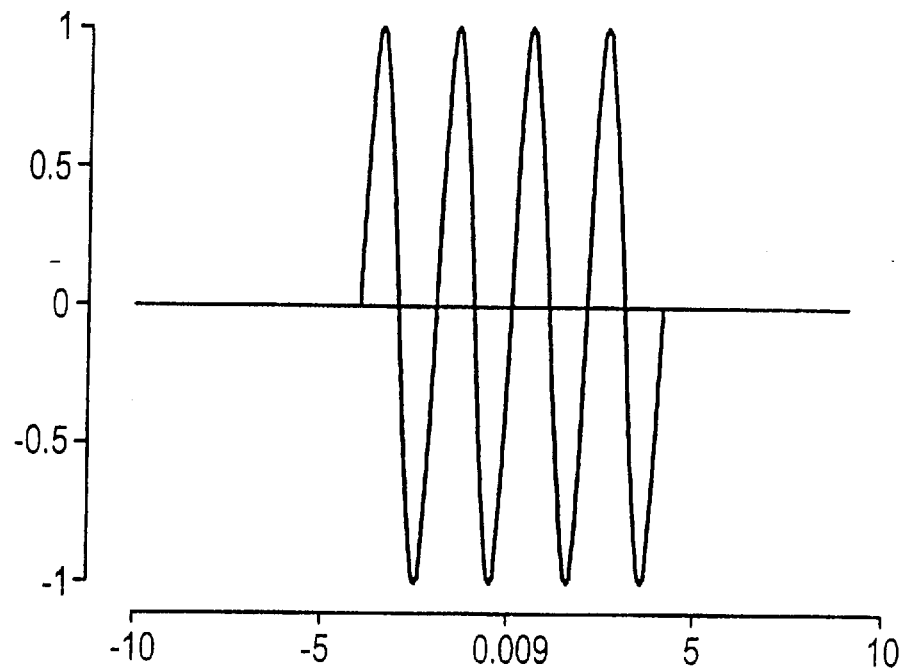

In FIG. 3 a general sinewave signal with 4 periods of amplitude 1 is added, and in the second half-period of the sinewave signal a higher-frequency sinewave signal with 5% of the amplitude is added. In the summed signal according to FIG. 4, this "irregularity" is due to the higher-frequency sinewave signal is no longer recognizable.

Two examples of the processing in accordance with the present invention clearly demonstrate when and for how long this "irregularity" arose.

Figure 5:
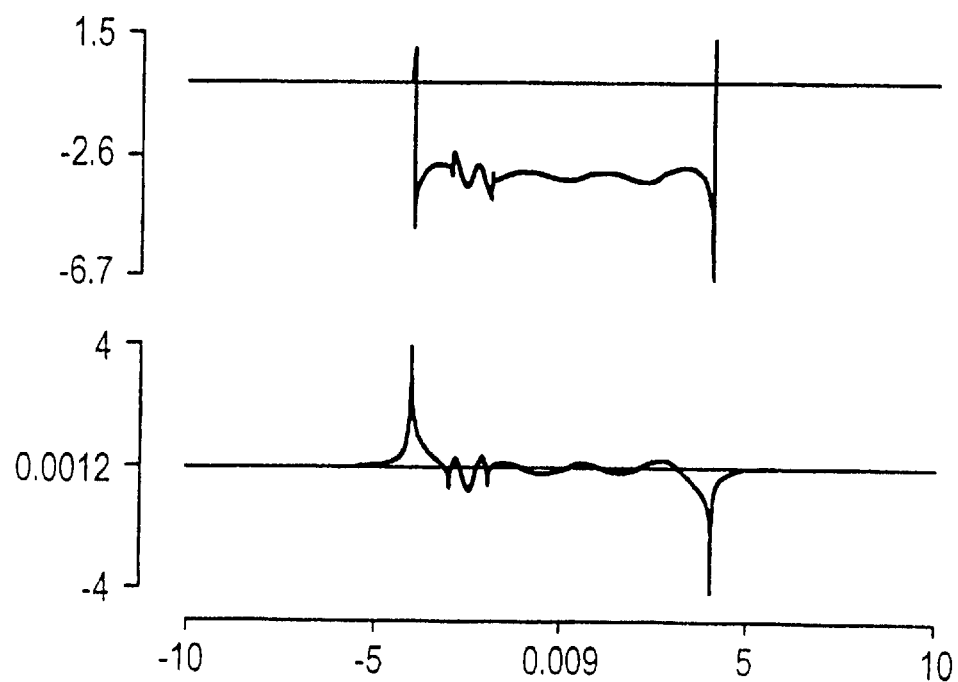
Figure 6:
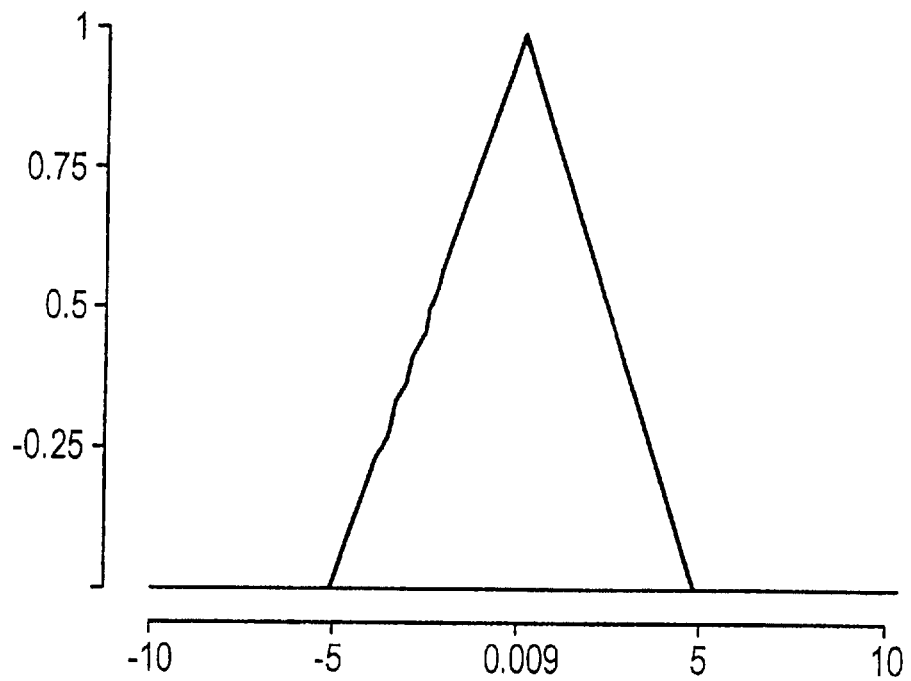

FIG. 5 represents $$\dot{\varphi}=\frac{d\arctan\frac{\hat{s}}{s}}{dt},$$

at the top, and $$\dot{z}=\frac{d\sqrt{s^2+\hat{s}^2}}{dt}$$

in the lower trace. In this signal processing, the desired information relating to the irregularity is contained and clearly brought out both in the radial velocity $\dot{z}$ and in the angular velocity $\dot{\varphi}$ of the complex signal $\bar{z}$ formed.

EXAMPLE 2

In a triangular signal according to FIG. 5, which for example may be an EEG signal from medical technology, small irregularities are added in the rising part by sinusoidal interference with a strength of one percent. In this case, FIG. 5 already shows the summed signal.

Figure 7:
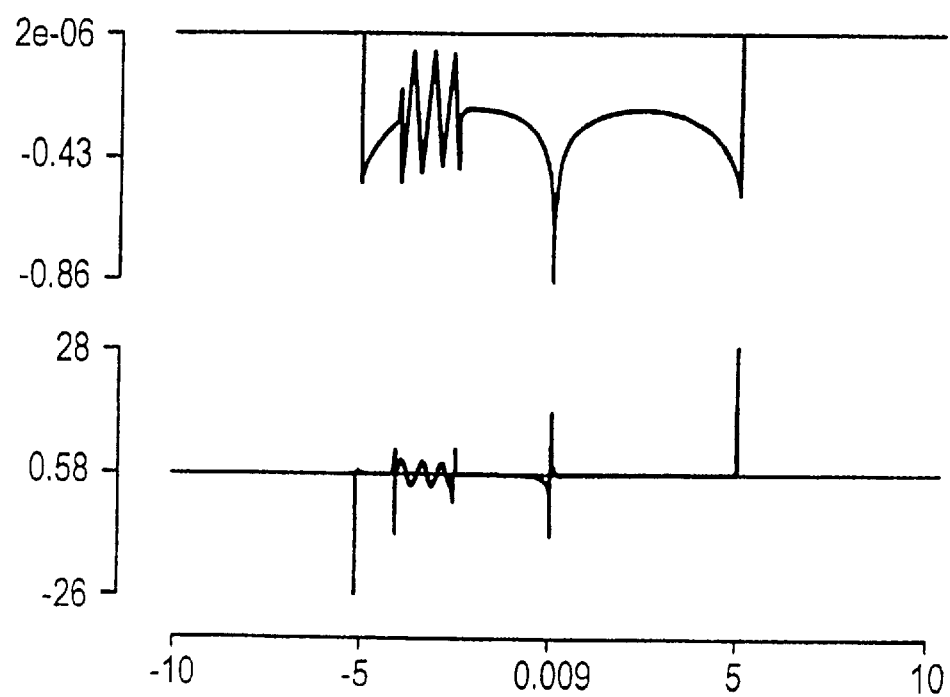

After processing with the novel method, in particular the derivation, according to FIG. 7 the irregularities in the signal waveforms of $\dot{\phi}$ in the upper trace, and in $\phi$ in the lower trace, are clear. These already optically recognizable irregularities can then be picked up and detected using simple recognition means according to the prior art.

Figure 8:
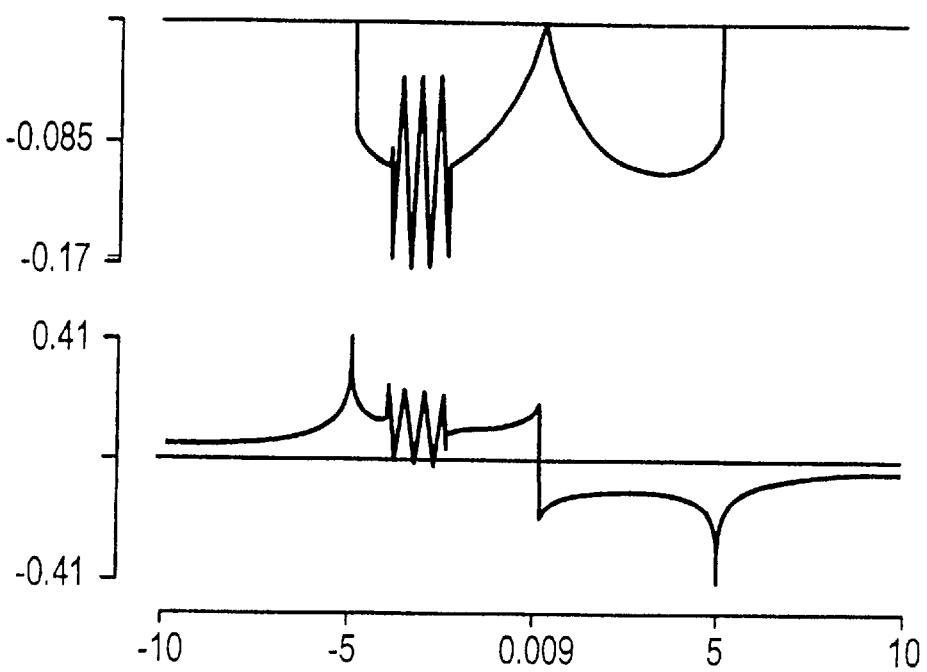
Figure 9:
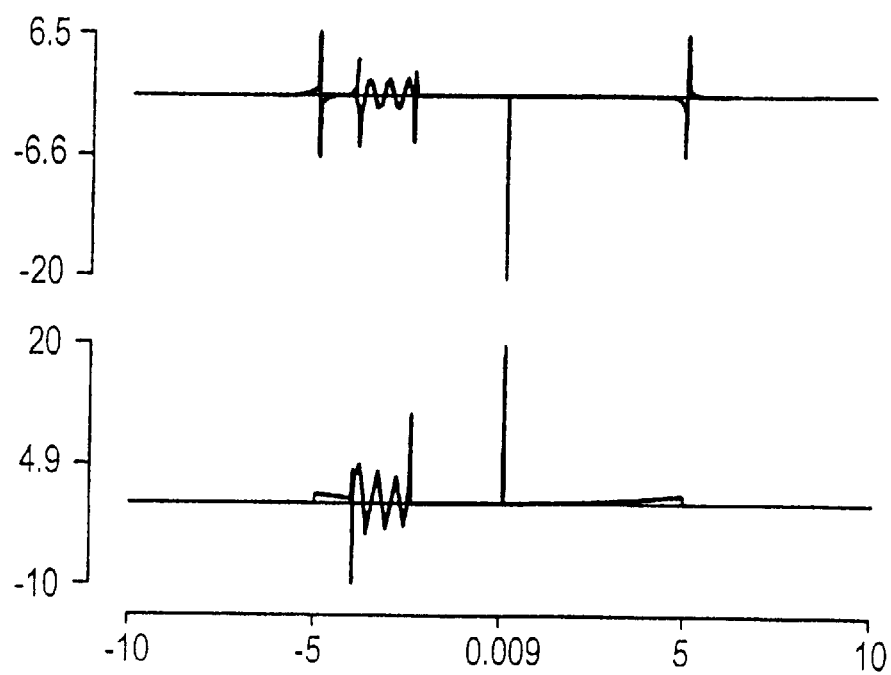

In FIG. 8, the product $s(k^*T_A)^*H\{s(k^*T_A)\}$ is plotted in the upper trace as a related variable, and $\dot{z}$ is plotted in the lower trace. FIG. 9 shows $\ddot{z}$ in the upper trace, and $\dot{\phi}$ in the lower trace, the imaginary part of the signal being in this case produced not by Hilbert transformation but by differentiation. All the signal waveforms show clear evidence of the interference.

EXAMPLE 3

Figure 10:
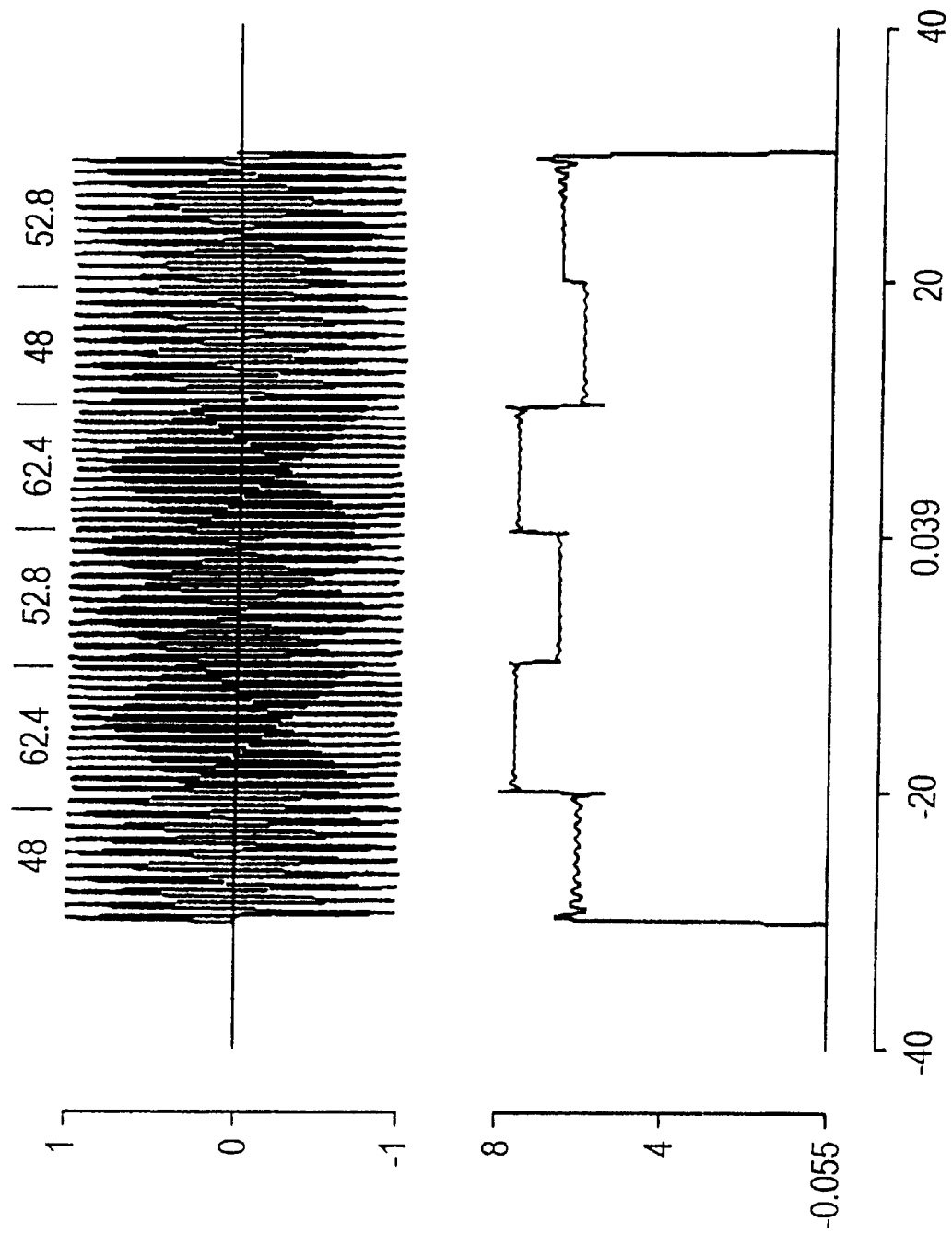

This example according to FIG. 10 is, for example applicable to the demodulation of a 3-level FSK signal (frequency shift keying signal), the relative frequency spacing being just as large as the data rate (here 4.8), that is to say there is a bandwidth efficiency of $$1\frac{Bit}{(s*\text{Hz})}.$$

In order to determine the instantaneous frequency $\dot{\phi}$, normalization to the square of the envelope $\bar{z}$ is carried out, that is to say the instantaneous frequency $\dot{\phi}$ is formed by the following formula:

$$\dot{\phi}_N = H\{s(k*T)\} * \frac{d\,s(k*T_A)}{d\,(k*T_A)} - \frac{d\,H\{s(k*T_A)\}}{d\,(k*T_A)} * s(k*T_A)$$

In FIG. 10 the FSK signal is represented in the upper trace, and $\dot{\phi}_N$ is represented in the lower trace. In this case, $\dot{\phi}_N$ is directly proportional to the instantaneous frequency. As can be readily seen, the data rate could be increased further for equal frequency spacings. Further signal processing may be advantageous to improve the response to interference.

The advantage according to the invention of this demodulation method consists in that, as a supplement to modern frequency-selective methods according to the prior art, there is also a time-selection criterion with which the so-called three-dimensional short-term spectrum can be determined more accurately and reliably. Frequency-selective separation of the example signal cannot be carried out in the case of a data rate equal to the frequency spacing.

EXAMPLE 4

Figure 11:
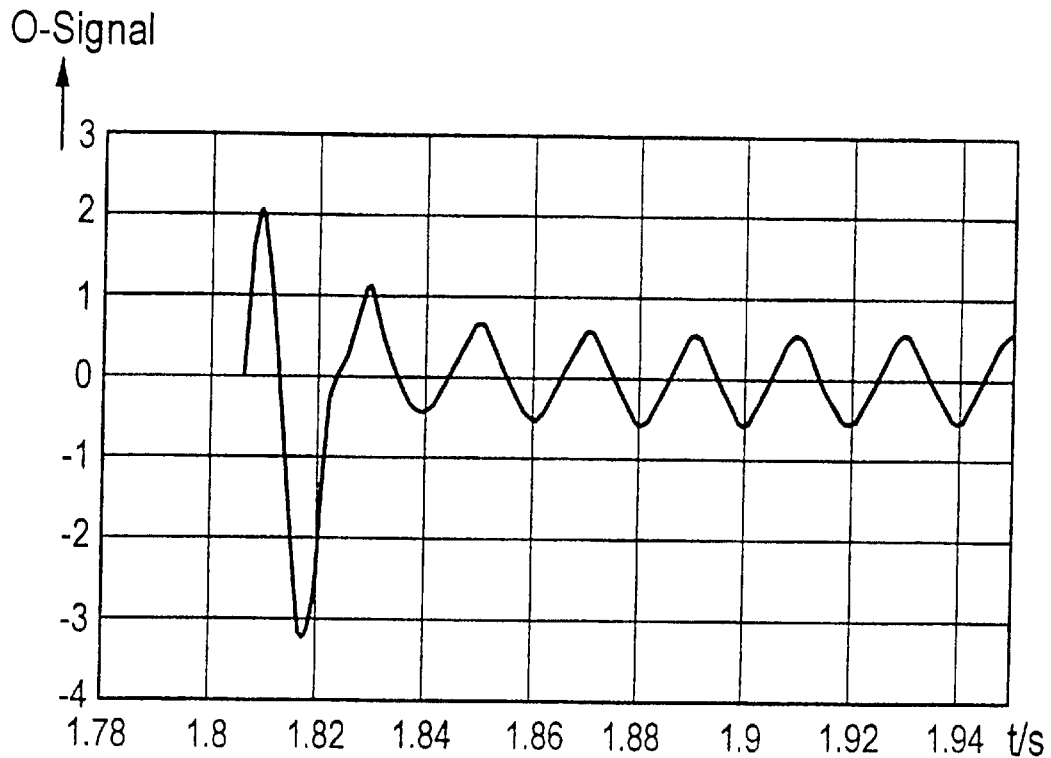
Figure 12:
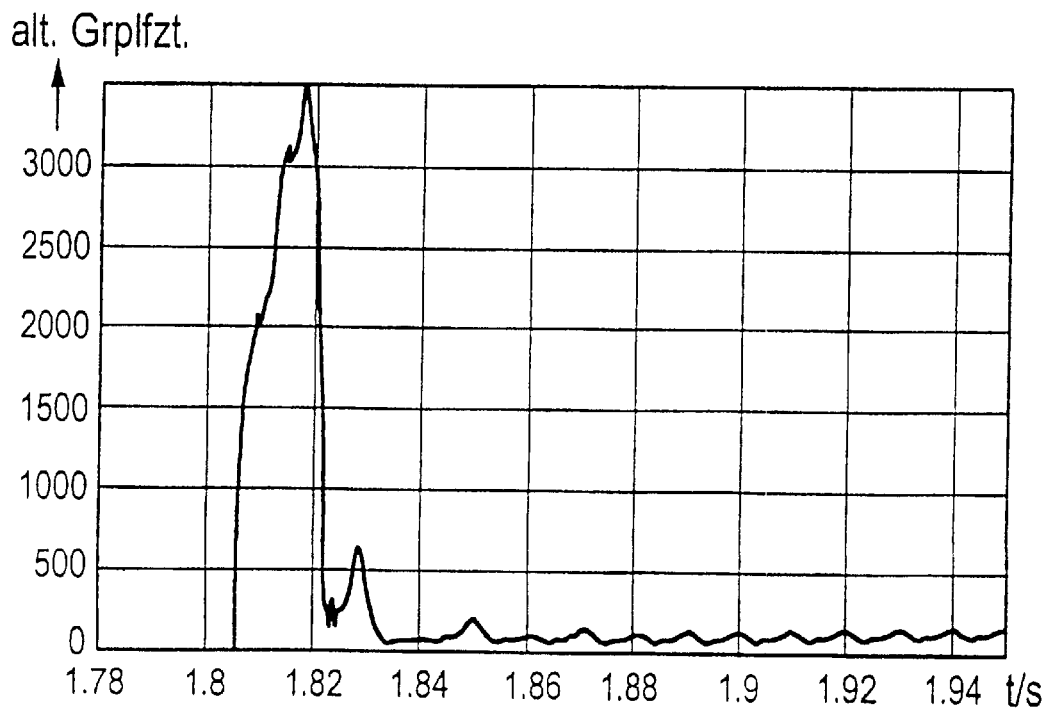

In this example, using the proposal according to the invention, the current waveform of AC voltage protection on switching on is measured as an analog signal and digitally evaluated. FIG. 11 shows the current waveform and FIG. 12 shows the signal waveform of $\dot{\phi}_N$, normalized to the square of the envelope. It is clear to see that the armature has been picked up and when this happened, and that there is in this case only minor rebound.

Examples of possibilities for employing the method and the device in the case of a technical signal waveform include:

recognizing the pick-up of an armature in the case of DC or AC voltage relays from the current waveform, ascertaining the cycles executed by a stepper motor from the current waveform, irregularities in systems for measuring position and displacement from the sensor signal, determining saturation in an instrument transformer, determining an interference signal in network protection technology, determining the instantaneous frequency in the case of FSK modulated signals for high speed data transmission, and determining irregularities in the case of rotary processes.

A special possibility for use is found, for example, in medicine, for example in the case of irregularities in cardiac valve activity, represented in so-called phonocardiograms, and in the signal representation and the analysis of "late potentials". These are multidimensional ECG signal which indicate sequelae in patients after a myocardial infarction.

A further application relates to measured-signal processing in an electrical power supply, in particular in low, medium or high voltage engineering, it being possible for a current or voltage signal of a power supply network to be used as the signal. In this case, the short processing times and the reliable working mode are particularly advantageous. Special applications relating to this case include metering technology (flow and electricity readings) and network protection technology, in which case there is once more a possibility for combination in connection with an information technology application.

We claim:

1. A method for detecting an irregularity in a signal, which comprises the following steps:

forming an orthogonal imaginary signal corresponding to a signal to be processed;

producing a time-dependent further signal based on the signal and the imaginary signal;

differentiating the further signal to form a differentiated signal; and subjecting the differentiated signal to detection with regard to an irregularity in the signal.

2. The method according to claim 1, whereby the producing step comprises forming a common mean signal as a weighted function of time from the signal and the imaginary signal.

3. The method according to claim 2, wherein the common mean signal is formed from the relationship $$\bar{z}(t) = \sqrt{k1 \cdot \hat{s}^2(t) + k2 \cdot s^2(t)},$$

wherein k1 and k2 are weighting factors, s(t) is the signal, and ŝ(t) is the imaginary signal.

4. The method according to claim 3, which comprises setting the factors k1 and k2 as being one of equal and unequal.

5. The method according to claim 1, wherein the producing step comprises forming the further signal as a ratio signal from the imaginary signal and the signal, and which further comprises matching the ratio signal to a finite set of values using a mapping function.

6. The method according to claim 1, which comprises differentiating the further signal at least two times.

7. The method according claim 6, wherein the subjecting step comprises subjecting the multiply differentiated signal to pattern recognition for detecting a signal irregularity.

8. The method according claim 1, wherein the subjecting step comprises subjecting the differentiated signal to pattern recognition for detecting a signal irregularity.

9. The method according to claim 1, which further comprises generating a message signal if an irregularity is recognized in the subjecting step.

10. The method according to claim 9, wherein the message signal is a signal selected from the group consisting of a display signal and a warning signal.

11. The method according to claim 1, wherein the signal to be processed is a signal used in a medical apparatus.

12. The method according to claim 11, wherein the signal to be processed is a signal selected from the group consisting of an on-line phonocardiogram signal, a late potential signal, and an EEG signal.

13. The method according to claim 1, which comprises processing the signal in a demodulation of a frequency-shift keying signal.

14. The method according to claim 1, wherein the signal to be processed is a signal in an electrical power supply.

15. The method according to claim 14, wherein the signal is a signal in one of low, medium, and high voltage engineering.

16. The method according to claim 14, wherein the signal is selected from the group consisting of a current signal and a voltage signal in a power supply network.

17. The method according to claim 16, which further comprises feeding the differentiated signal to a protective device.

18. The method according to claim 16, which further comprises feeding the differentiated signal to a metering instrument.

19. An apparatus for detecting an irregularity in a signal, comprising:

a first device for forming an orthogonal imaginary signal from a signal to be processed;

a second device connected to said first device for producing a time-dependent further signal based on the signal and the imaginary signal;

a differentiating member connected to receive the further signal from said second device for forming a differentiated signal; and a detector connected to said differentiating member for detecting from the differentiated signal an irregularity in the signal.

20. The device according to claim 19, wherein said second device comprises an averager for producing from the signal and the imaginary signal a common mean signal as a function of time.

21. The device according to claim 19, wherein said second device comprises a divider component for producing a ratio signal from the imaginary signal and the signal, and a mapping component for mapping the ratio signal onto a finite set of values using a mapping function.

22. The device according to claim 19, wherein said differentiating component is a first differentiating component, and including a second differentiating component connected to said first differentiating component for differentiating the differentiated signal output by said first differentiating component.

23. The device according to claim 22, which further comprises a third differentiating component connected to said second differentiating component.

24. The device according to claim 19, wherein said differentiating component has a second or further differentiating function.

25. The device according to claim 19, which further comprises a pattern-recognition module connected to said differentiating component.

26. The device according to claim 19, which comprises a computer, and wherein said first device, said second device, said differentiating member, and said detector are respective program modules being processed in said computer.

* * * * *